US009950641B2

(12) United States Patent
Shimizu et al.

(10) Patent No.: US 9,950,641 B2
(45) Date of Patent: Apr. 24, 2018

(54) STRADDLE-TYPE ELECTRIC VEHICLE (71) Applicant: YAMAHA HATSUDOKI KABUSHIKI KAISHA, Iwata-shi, Shizuoka (JP)

(72) Inventors: Tsukasa Shimizu, Shizuoka (JP); Hideki Shirazawa, Shizuoka (JP); Fuminao Obayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/275,622

(22) Filed: Sep. 26, 2016

(65) Prior Publication Data

US 2017/0088013 A1 Mar. 30, 2017

(30) Foreign Application Priority Data

Sep. 28, 2015 (JP) ................... 2015-190156

(51) Int. Cl.
*B60K 1/04* (2006.01)
*B60L 15/20* (2006.01)
(Continued)

(52) U.S. Cl.
CPC ............... *B60L 15/20* (2013.01); *B60K 1/04* (2013.01); *B60L 11/1803* (2013.01); *B60L 11/1877* (2013.01); *B62K 11/14* (2013.01); *B62K 23/02* (2013.01); *B62M 7/04* (2013.01); *B60K 2001/0422* (2013.01); *B60L 2200/12* (2013.01);
(Continued)

(58) Field of Classification Search
CPC .. B60L 15/20; B60L 11/1877; B60L 11/1803; B60L 2200/12; B60L 2210/40; B60L 2250/16; B60L 2250/26; B62K 11/14; B62K 23/02; B62K 2204/00; B62K 2208/00; B62K 11/12; B62M 7/04; B62M 7/06; B60K 1/04; B60K 2001/0422; Y02T 10/7258
See application file for complete search history.

(56) References Cited

U.S. PATENT DOCUMENTS 5,101,924 A * 4/1992 Yamagiwa ............... B62M 7/12
180/220
5,207,288 A * 5/1993 Ono ....................... B62K 11/00
180/220
(Continued)

FOREIGN PATENT DOCUMENTS

EP 0 531 200 A2 3/1993
EP 2 682 330 A1 1/2014
(Continued)

*Primary Examiner* — Jacob B Meyer
(74) *Attorney, Agent, or Firm* — Keating and Bennett, LLP (57) ABSTRACT An electric motorcycle includes a vehicle controller that outputs an instruction value based on an operation amount of at least an accelerator grip, and a motor driving unit that supplies a driving electric power in accordance with the instruction value to an electric motor. The vehicle controller is disposed outside a case that includes the motor driving unit disposed therein. The distance from the steering handle to the vehicle controller is shorter than the distance from the steering handle to the motor driving unit in a side view of the vehicle body, to simplify the cost of the electric wire and the work required to lay out the electric wire.

18 Claims, 8 Drawing Sheets

(51) Int. Cl.
*B60L 11/18* (2006.01)
*B62K 11/14* (2006.01)
*B62M 7/04* (2006.01)
*B62K 23/02* (2006.01)

(52) U.S. Cl.
CPC ....... *B60L 2210/40* (2013.01); *B60L 2250/16* (2013.01); *B60L 2250/26* (2013.01); *B62K 2204/00* (2013.01); *B62K 2208/00* (2013.01); *Y02T 10/7258* (2013.01)

(56) References Cited

U.S. PATENT DOCUMENTS

| | | | | |
|---|---|---|---|---|
| 5,406,154 | A * | 4/1995 | Kawaguchi | B60L 7/10 180/220 |
| 5,610,814 | A * | 3/1997 | Sugioka | B60L 3/00 180/273 |
| 5,644,202 | A * | 7/1997 | Toriyama | B60L 3/0023 318/369 |
| 5,657,830 | A * | 8/1997 | Kawashima | B62K 25/283 180/220 |
| 6,798,160 | B2 * | 9/2004 | Wakitani | B60L 3/0023 318/135 |
| 7,118,431 | B2 * | 10/2006 | Mizuno | B63H 11/113 440/1 |
| 7,124,852 | B2 * | 10/2006 | Hasegawa | B60R 21/0132 180/282 |
| 7,481,288 | B2 * | 1/2009 | Makuta | B62M 7/12 180/68.1 |
| 7,931,110 | B2 * | 4/2011 | Nishiura | B60L 11/18 180/218 |
| 8,002,067 | B2 * | 8/2011 | Nishiura | B62K 25/283 180/218 |
| 8,028,785 | B2 * | 10/2011 | Kanno | B60K 7/0007 180/220 |
| 8,556,018 | B2 * | 10/2013 | Fujihara | B60L 11/1877 180/220 |
| 8,596,401 | B2 * | 12/2013 | Ishikawa | B62M 7/04 180/220 |
| 8,694,202 | B2 * | 4/2014 | Hattori | B62J 99/00 224/413 |
| 8,776,936 | B2 * | 7/2014 | Mimura | B60K 7/0007 180/220 |
| 8,936,129 | B2 * | 1/2015 | Honda | B62K 11/10 180/220 |
| 9,162,587 | B2 * | 10/2015 | Matsushima | B62M 11/06 |
| 9,187,008 | B2 * | 11/2015 | Inoue | B62J 9/00 |
| 9,238,497 | B2 * | 1/2016 | Matsuda | B62K 11/04 |
| 9,457,668 | B2 * | 10/2016 | Matsuda | B62K 11/04 |
| 2003/0085680 | A1 * | 5/2003 | Wakitani | B60L 3/0023 318/432 |
| 2004/0195025 | A1 * | 10/2004 | Kitamura | B60L 1/16 180/206.2 |
| 2008/0319687 | A1 * | 12/2008 | Kurosawa | F17C 13/025 702/50 |
| 2010/0131164 | A1 * | 5/2010 | Carter | B60L 11/1805 701/61 |
| 2011/0246024 | A1 * | 10/2011 | Hattori | B62J 99/00 701/36 |
| 2012/0065825 | A1 * | 3/2012 | Nicoson | B62K 11/04 701/22 |
| 2012/0103716 | A1 * | 5/2012 | Fujihara | B60L 11/1877 180/220 |
| 2012/0111137 | A1 * | 5/2012 | Bliss | B60K 26/02 74/504 |
| 2012/0266717 | A1 * | 10/2012 | Sakai | B62K 11/14 74/551.9 |
| 2014/0015656 | A1 * | 1/2014 | Shimizu | B62J 3/00 340/425.5 |
| 2014/0257650 | A1 * | 9/2014 | Carter | B60L 11/1805 701/51 |
| 2014/0292075 | A1 | 10/2014 | Matsuda | |
| 2014/0336858 | A1 * | 11/2014 | Matsushima | B62M 11/06 701/22 |
| 2014/0379209 | A1 * | 12/2014 | Matsuda | B60L 15/20 701/34.2 |
| 2015/0008053 | A1 * | 1/2015 | Matsuda | B62K 11/04 180/65.1 |
| 2015/0021985 | A1 * | 1/2015 | Matsuda | B60L 11/1877 307/10.1 |
| 2015/0122562 | A1 * | 5/2015 | Miyashiro | B62M 6/90 180/68.5 |
| 2015/0122570 | A1 | 5/2015 | Miyashiro | |
| 2015/0274019 | A1 * | 10/2015 | Matsuda | B62K 11/04 701/22 |
| 2015/0291046 | A1 * | 10/2015 | Kawabata | B60L 11/1818 180/220 |
| 2016/0257370 | A1 * | 9/2016 | Hashimoto | B62M 25/08 |
| 2016/0297499 | A1 * | 10/2016 | Ohashi | B62M 6/45 |
| 2017/0113634 | A1 * | 4/2017 | Tanaka | B60R 16/0207 |

FOREIGN PATENT DOCUMENTS

| | | |
|---|---|---|
| EP | 2 772 384 A1 | 9/2014 |
| EP | 2 799 274 A1 | 11/2014 |
| EP | 2 799 275 A1 | 11/2014 |
| EP | 2 871 126 A1 | 5/2015 |
| EP | 2 910 400 A1 | 8/2015 |
| JP | 2015-089757 A | 5/2015 |
| WO | 2008/095116 A2 | 8/2008 |
| WO | 2013/061484 A1 | 5/2013 |

* cited by examiner

STRADDLE-TYPE ELECTRIC VEHICLE

CROSS-REFERENCE TO RELATED APPLICATION

The present application claims priority to Japanese application JP 2015-190156 filed on Sep. 28, 2015, the entire contents of which are hereby incorporated by reference into this application.

BACKGROUND OF THE INVENTION

1. Field of the Invention

The present invention relates to a straddle-type electric vehicle that is driven by an electric motor.

2. Description of the Related Art

Japanese Patent Laid-open Publication No. 2015-089757 and WO 2013/061484 disclose a straddle-type electric vehicle that use an electric motor as a driving source of the vehicle. The electric vehicle includes a control unit for outputting an instruction value in response to an operation by a driver on an accelerator operation member and an inverter that supplies a driving electric power to an electric motor in accordance with the instruction value (in WO 2013/061484, the control unit is referred to as an "ECU"). In the vehicle disclosed in Japanese Patent Laid-open Publication No. 2015-89757, a motor case that stores the electric motor is disposed below a battery case, and the inverter is located in the motor case. In the vehicle disclosed in WO 2013/061484, a case that stores the inverter is disposed behind the battery case.

WO 2013/061484 further discloses that an operation member, such as a main key, a light switch, or the like, besides the accelerator operation member, is connected to the controller.

When the control unit is disposed in the case that stores the inverter, the electric components are able to be assembled together within a smaller area. However, since many operation members of a straddle-type electric vehicle are provided on a steering handle, a long electric wire is necessary to connect the operation members and the control unit when the control unit is located in the case that stores the inverter. This creates troublesome work in laying out the electric wire and increases the cost of the electric wire.

SUMMARY OF THE INVENTION

Preferred embodiments of the present invention provide a straddle-type electric vehicle that facilitates the work of laying out an electric wire, and that reduces the cost of the electric wire.

A straddle-type electric vehicle according to a preferred embodiment of the present invention includes a driving wheel; an electric motor that drives the driving wheel; a plurality of operation members that are operated by a driver, the plurality of operation members being mounted on a steering handle and including an accelerator operation member; a vehicle controller electrically connected to the plurality of operation members and configured or programmed to output an instruction value based on at least an amount of operation of the accelerator operation member; a motor driving unit electrically connected to the vehicle controller and configured or programmed to supply a driving electric power to the electric motor in accordance with the instruction value; and a case including the motor driving unit disposed therein. The vehicle controller is disposed outside the case. A distance from the steering handle to the vehicle controller is shorter than a distance from the steering handle to the motor driving unit in a side view of a vehicle body. The above described arrangement of the vehicle controller simplifies the work of laying out an electric wire and also prevents an increase in the cost of the electric wire.

In a straddle-type electric vehicle according to a preferred embodiment of the present invention, the steering handle is preferably supported so as to be operated by a driver to turn rightward and leftward, and the vehicle controller is preferably mounted to turn together with the steering handle. This enables the distance between the operation member provided on the steering handle and the vehicle controller to remain unchanged when the steering handle turns, and thus enables the electric wire to be easily shortened.

A straddle-type electric vehicle according to a preferred embodiment of the present invention preferably further includes a front fork on which the steering handle is mounted. The vehicle controller is preferably supported by the front fork.

In a straddle-type electric vehicle according to a preferred embodiment of the present invention, the front fork preferably includes a right suspension and a left suspension, and the vehicle controller is preferably positioned between the right suspension and the left suspension in a front view of the vehicle body. This makes it easier to support the vehicle controller by both of the right suspension and the left suspension, which readily improves the stability of supporting the vehicle controller.

In a straddle-type electric vehicle according to a preferred embodiment of the present invention, the vehicle controller is preferably supported by the steering handle.

A straddle-type electric vehicle according to a preferred embodiment of the present invention preferably further includes a meter controller configured or programmed to control a meter indicating a state of running of the vehicle. The meter controller and the vehicle controller are preferably both supported by the front fork.

In a straddle-type electric vehicle according to a preferred embodiment of the present invention, the vehicle controller is preferably mounted on a substrate of the meter controller. This reduces the number of components.

In a straddle-type electric vehicle according to a preferred embodiment of the present invention, the plurality of operation members preferably include at least one of a main switch that activates the vehicle controller, a motor start switch, and a motor stop switch.

In a straddle-type electric vehicle according to a preferred embodiment of the present invention, the steering handle and the vehicle controller are preferably both located higher than the motor driving unit.

A straddle-type electric vehicle according to a preferred embodiment of the present invention preferably further includes a first battery that stores electric power to be supplied to the electric motor. The motor driving unit and the electric motor are preferably disposed below the first battery, and the vehicle controller is preferably disposed forward of the first battery. This shortens the electric wire that connects the motor driving unit and the electric motor and also the electric wire that connects the operation member provided on the steering handle and the vehicle controller.

A straddle-type electric vehicle according to a preferred embodiment of the present invention preferably further includes a first battery that stores electric power to be supplied to the electric motor, and a second battery that outputs a voltage lower than a voltage outputted by the first battery. The vehicle controller is preferably connected to the second battery.

In a straddle-type electric vehicle according to a preferred embodiment of the present invention, the second battery and the vehicle controller are preferably positioned higher than the motor driving unit and are electrically connected to each other. This shortens the electric wire that connects the second battery and the vehicle controller.

In a straddle-type electric vehicle according to a preferred embodiment of the present invention, the second battery is preferably disposed outside the case including the motor driving unit disposed therein. This makes it easier to shorten the electric wire that connects the second battery and the vehicle controller.

A straddle-type electric vehicle according to a preferred embodiment of the present invention preferably further includes a first battery that stores electric power to be supplied to the electric motor. The first battery, the electric motor, and the motor driving unit are preferably disposed in a middle portion of the vehicle body, and the vehicle controller is preferably spaced forward from the first battery, the electric motor, and the motor driving unit. This layout shortens an electric wire that carries a large electric current (specifically, the electric wire that connects the first battery and the motor driving unit and the electric wire that connects the motor driving unit and the electric motor). Further, this layout shortens the electric wire that connects the vehicle controller and the operation member provided on the steering handle.

A straddle-type electric vehicle according to a preferred embodiment of the present invention preferably further includes a case that stores the first battery, and an electric wire electrically connecting the vehicle controller and the motor driving unit to each other. The case including the motor driving unit disposed therein is preferably fixed to the case that stores the first battery, and the electric wire preferably extends through inside of the case that stores the first battery to reach the motor driving unit. This reduces a portion of the electric wire that electrically connects the vehicle controller and the motor driving unit that is exposed outside the vehicle body. Accordingly, this prevents a driver or an operator from unintentionally touching the electric wire.

In a straddle-type electric vehicle according to a preferred embodiment of the present invention, the vehicle controller is preferably configured or programmed to calculate the instruction value based on an operation of an operation member different from the accelerator operation member and/or a state of the vehicle detected by a sensor, in addition to the amount of operation of the accelerator operation member.

The above and other elements, features, steps, characteristics and advantages of the present invention will become more apparent from the following detailed description of the preferred embodiments with reference to the attached drawings.

DETAILED DESCRIPTION OF THE INVENTION

In the following, straddle-type electric vehicles according to preferred embodiments of the present invention will be described. In this specification, an electric motorcycle will be described as one non-limiting example of a straddle-type electric vehicle. The present invention may be applied to, for example, a straddle-type automobile or a straddle-type tricycle. Preferred embodiments of the present invention include an electric motorcycle of a type in which a battery that supplies electric power to an electric motor to be described below is disposed at a relatively high position and the battery is positioned between the legs of a driver. However, preferred embodiments of the present invention may be applied to an electric motorcycle of a scooter type.

Figure 1:
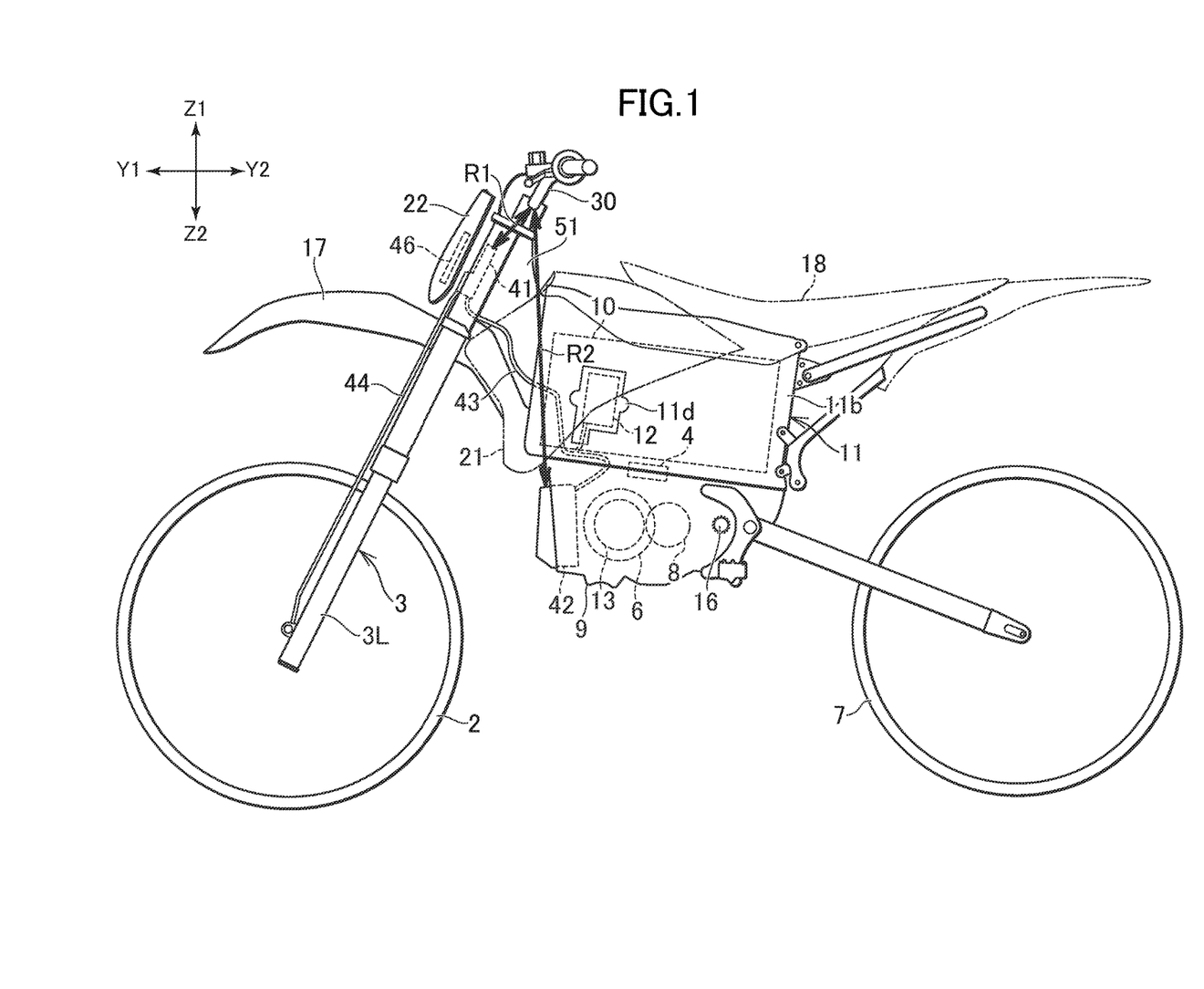
FIG. 1 is a side view of an electric motorcycle, which is one example of a straddle-type electric vehicle.
Figure 2:
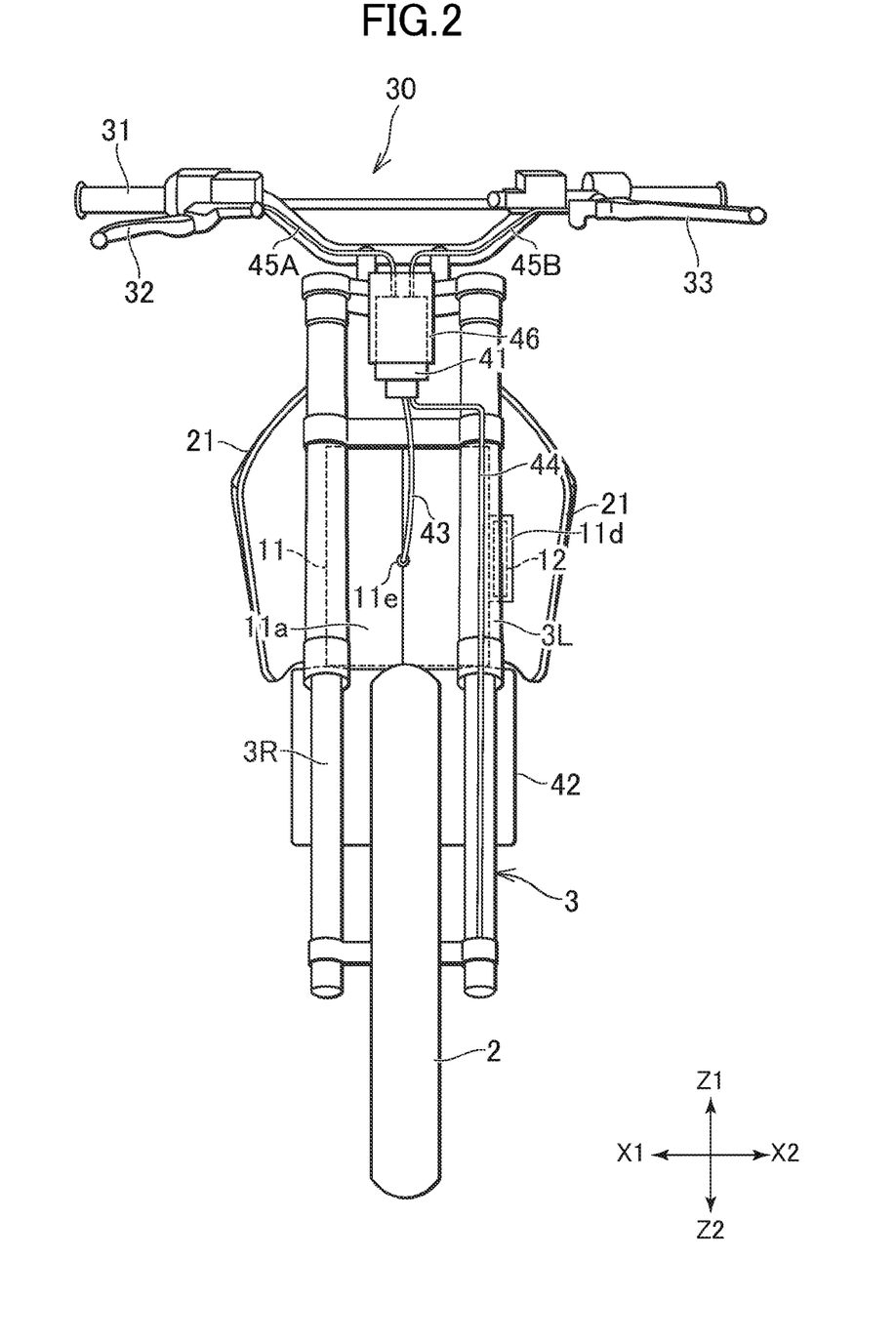
FIG. 2 is a front view of an electric motorcycle.
Figure 3:
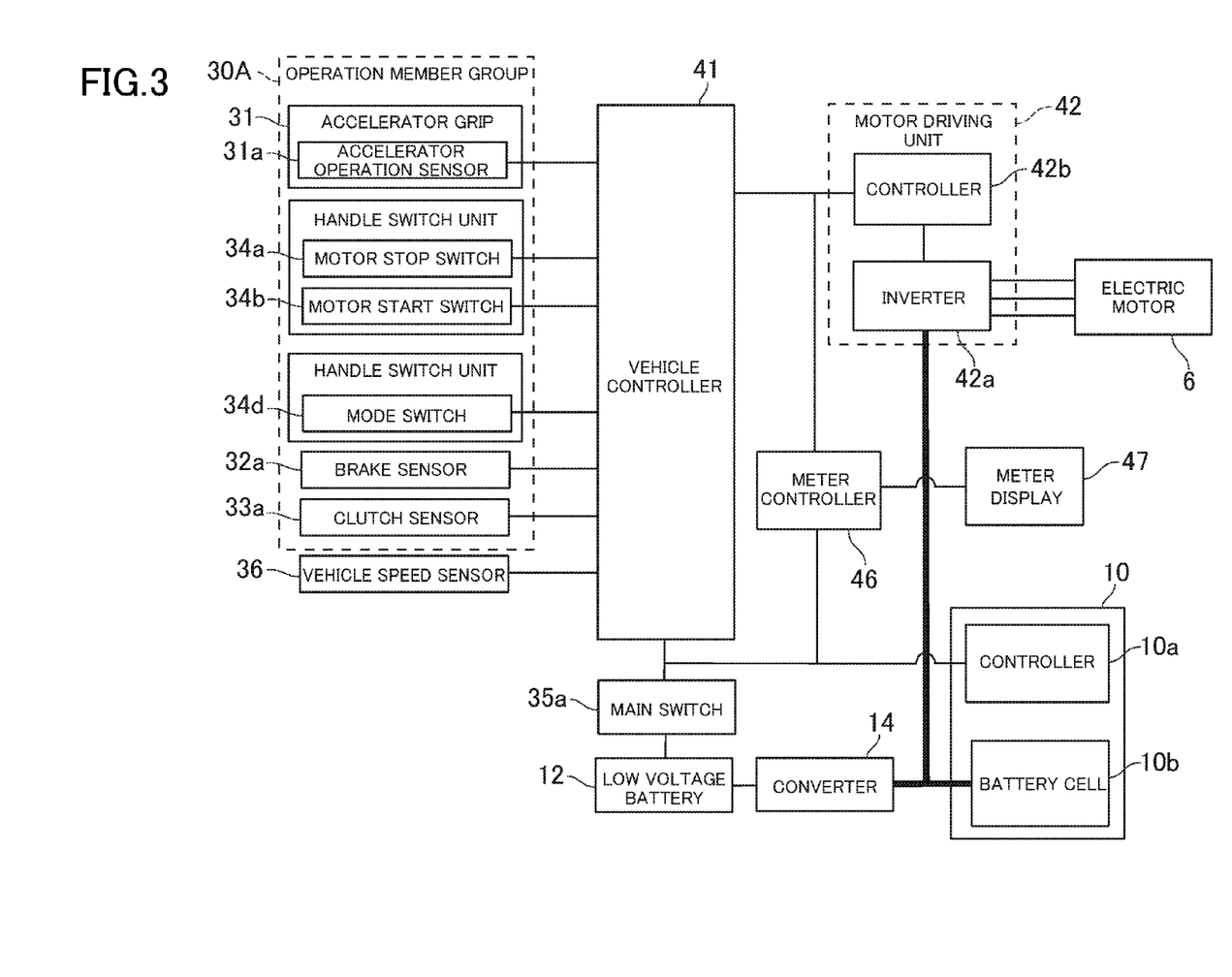
FIG. 3 is a block diagram showing a structure of an electric motorcycle.
Figure 4:
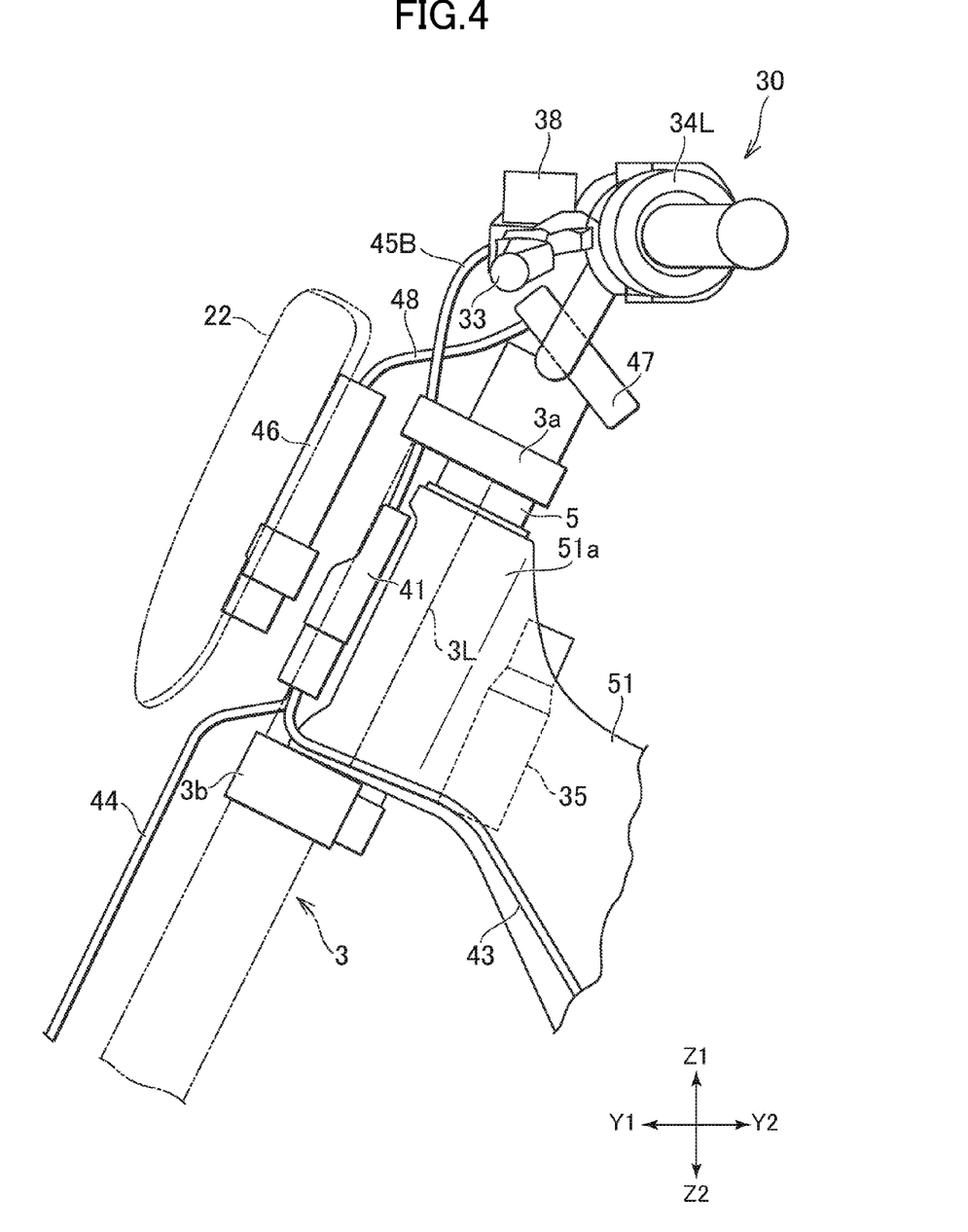
FIG. 4 is a side view showing a front portion of an electric motorcycle.
Figure 5:
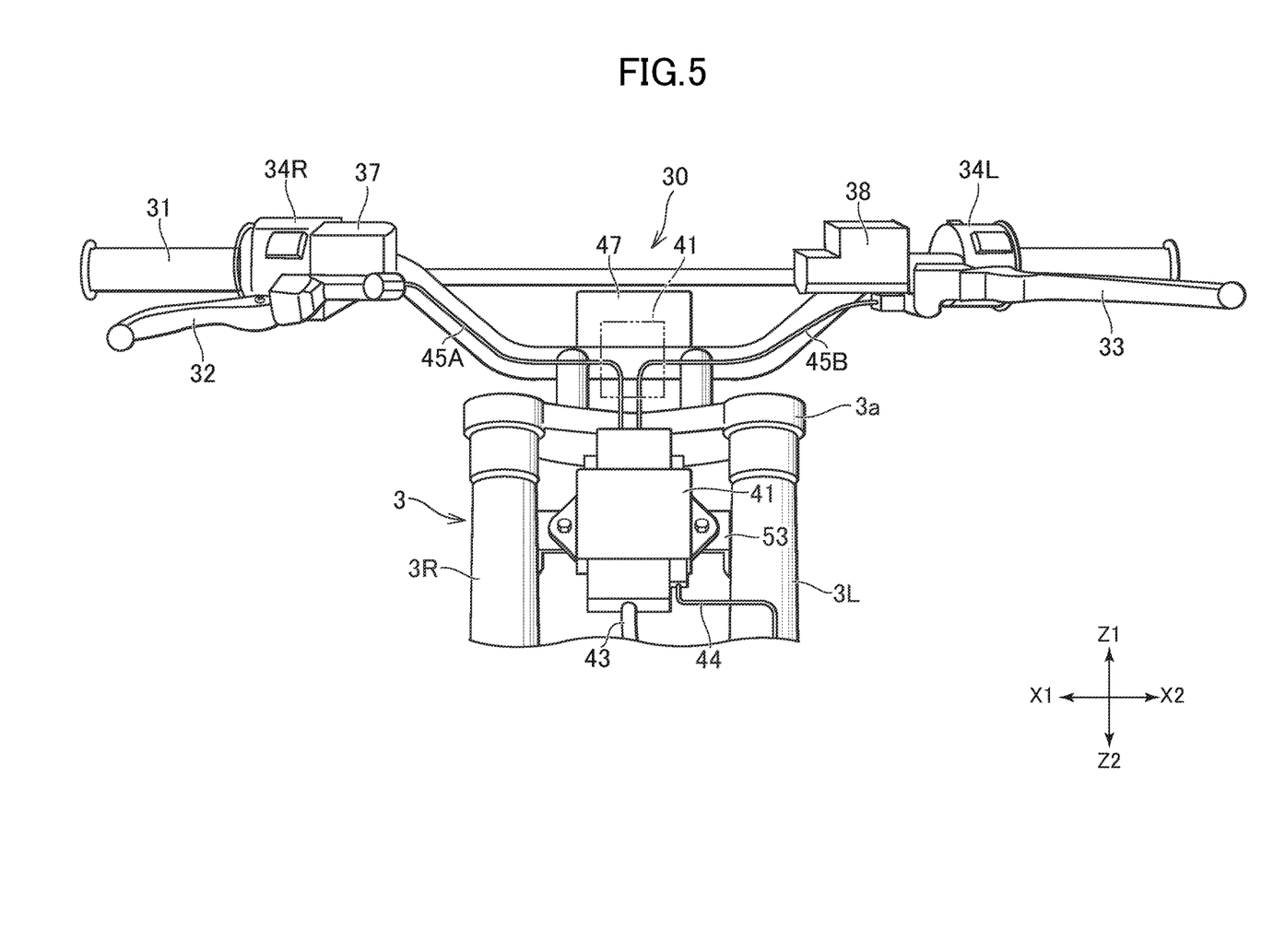
FIG. 5 is a front view showing a front portion of an electric motorcycle in which a front panel and a meter controller are removed, and a vehicle controller is shown.
Figure 6:
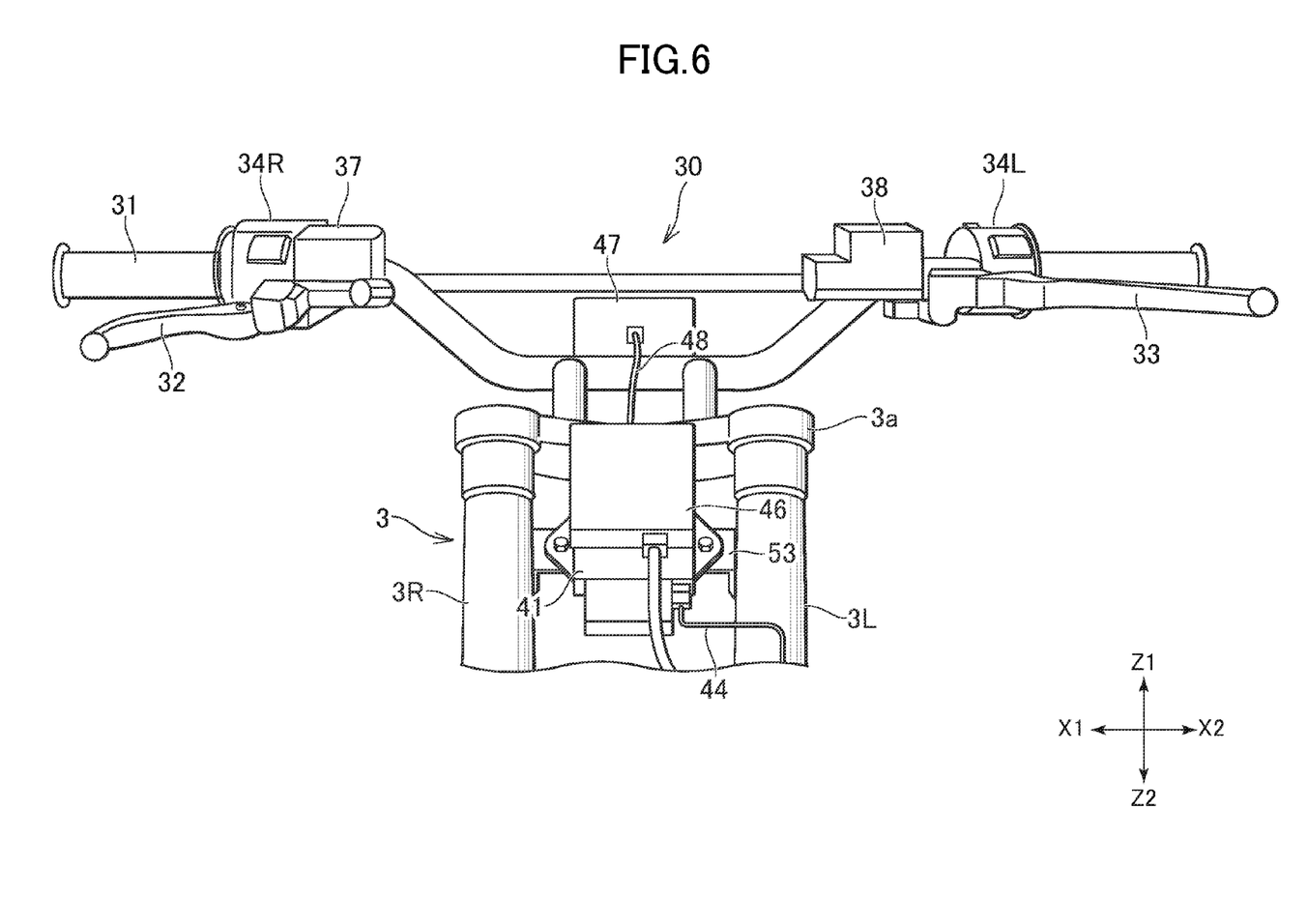
FIG. 6 is a front view showing a front portion of an electric motorcycle, in which the meter controller, not shown in FIG. 5, is shown.
Figure 7:
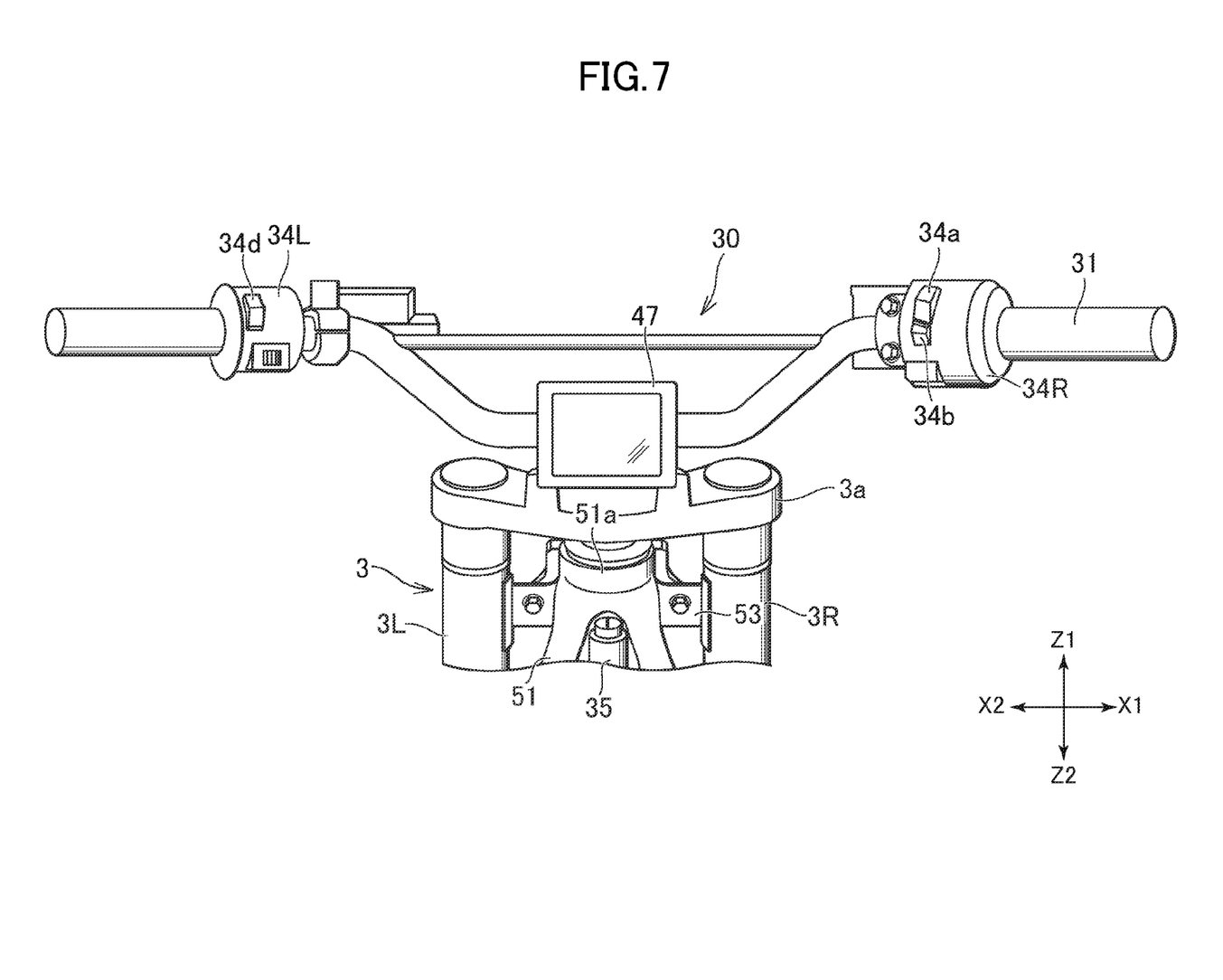
FIG. 7 shows a steering handle viewed from the rear thereof.

FIG. 1 is a side view of an electric motorcycle 1. FIG. 2 is a front view of the electric motorcycle 1. FIG. 3 is a block diagram showing a structure of the electric motorcycle 1. FIGS. 4 to 6 show a front portion of the electric motorcycle 1. FIG. 4 is a side view, and FIG. 5 is a front view. In FIG. 5, a front panel 22 and a meter controller 46 to be described below are removed and, thus, a vehicle controller 41 is shown. FIG. 6 is a front view. In FIG. 6, the meter controller 46, removed in FIG. 5, is shown. FIG. 7 shows a steering handle 30 viewed from the rear thereof.

In the description below, the arrows Y1 and Y2 indicate the forward and rearward directions, respectively, of the vehicle, X1 and X2 indicate the rightward and leftward directions, respectively, of the vehicle, and Z1 and Z2 indicate the upward and downward directions, respectively, of the vehicle. The direction indicated by the arrows X1-X2 is referred to as the vehicle width direction or the left-right direction.

As shown in FIG. 1, the electric motorcycle 1 includes an electric motor 6 and a driving wheel that is driven by the electric motor 6. The electric motorcycle 1 includes a rear wheel 7 as a driving wheel. A torque (rotation) of the electric motor 6 is transmitted to the rear wheel 7 via a deceleration mechanism 8 and a transmission member (not shown), such as a chain, a belt, a shaft, or the like. The deceleration mechanism 8 preferably includes, for example, a plurality of gears. The electric motor 6 and the deceleration mechanism 8 are disposed in a drive mechanism case 9. A clutch 13 that transmits a torque (rotation) or disconnects the transmission is preferably disposed in the drive mechanism case 9. A rotation member 16 such as a sprocket or the like is disposed in the rear portion of the drive mechanism case 9. A transmission member such as a chain, a belt, a shaft or the like is connected to the rotation member 16.

As shown in FIG. 1, the electric motorcycle 1 includes a battery 10 that stores electric power to be supplied to the electric motorcycle 1. Further, the electric motorcycle 1 includes a battery 12 that supplies electric power at a voltage lower than a voltage of electric power from the battery 10 to the vehicle controller 41, the meter controller 46, or electric components such as a light (not shown), or the like. The vehicle controller 41 and the meter controller 46 will be described below in detail. In the following, the battery 10 will be referred to as a "high voltage battery", and the battery 12 will be referred to as a "low voltage battery". The high voltage battery corresponds to a "first battery", and the "low voltage battery" corresponds to a "second battery".

The electric motorcycle 1 includes a battery storage that stores the high voltage battery 10. As shown in FIG. 1, the electric motorcycle 1 includes, as a battery storage, a battery case 11 including a front wall portion 11*a* (see FIG. 2), left and right side wall portions 11*b*, and a rear wall portion. The battery storage is not limited to the battery case 11. For example, the electric motorcycle 1 may include a right frame and a left frame that extend rearward from a head pipe 51*a* (see FIG. 4) provided at a foremost portion 51 of the vehicle body frame. In this case, the space between the right frame and the left frame is used as a battery storage for the high voltage battery 10. In a preferred embodiment of the electric motorcycle 1, the battery case 11 is disposed behind the head pipe 51*a*, and at least a portion of the head pipe 51*a* overlaps the battery case 11 in a front view of the vehicle body. As shown in FIG. 1, the battery case 11 preferably includes a case cover 11*g* that is attached to the upper portion thereof and is able to be opened and closed. The battery 10 is preferably removable relative to the battery case 11. The electric motorcycle 1 includes a seat 18 which a driver straddles. In a preferred embodiment of the electric motorcycle 1, the battery case 11 is disposed below the front portion of the seat 18.

In the electric motorcycle 1, the battery case 11 preferably defines a portion of the vehicle body frame. Specifically, the rear end portion of the foremost portion 51 including the head pipe 51*a* is fixed to the front wall portion 11*a* of the battery case 11. A seat rail 52 that supports the seat 18 is fixed to the rear portion of the battery case 11. The structure of the vehicle body frame of the electric motorcycle 1 is not limited to the above described example. For example, a vehicle body frame may be provided separately from the battery case 11.

As shown in FIG. 1, the electric motorcycle 1 includes a front wheel 2, a front fork 3, and a steering handle 30. The steering handle 30 is attached to the upper end portion of the front fork 3. The front fork 3 supports the front wheel 2 on the lower end portion thereof, and is turnable leftward and rightward about a steering shaft 5 (see FIG. 4). The front wheel 2, the front fork 3, and the steering handle 30 integrally turn rightward and leftward in response to an operation of the steering handle 30 by a driver.

As shown in FIG. 2, an accelerator grip 31 is provided at an end portion (specifically, the right end portion) of the steering handle 30 (the accelerator grip 31 corresponds to an "accelerator operation member"). A plurality of operation members are provided on the steering handle 30 besides the accelerator grip 31. One example of the operation member is a brake lever 32 that brakes either one or both of the rear wheel 7 and the front wheel 2. Further, a clutch lever 33 that operates a clutch 13 may be provided on the steering handle 30.

Further, a plurality of operation switches that are operated by a driver may be provided as the operation members. FIGS. 3 and 7 shows, as examples of the operation members, a motor stop switch 34*a* that stops driving of the electric motor 6, a motor start switch 34*b* that starts driving the electric motor 6, a mode switch 34*d* that switches control modes. The operation member provided on the steering handle 30 is not limited to the examples described herein. As shown in FIG. 7, the steering handle 30 includes a switch assembly 34R on the right side thereof and a switch assembly 34L on the left side thereof. Some of the plurality of operation members (for example, the motor stop switch 34*a*, the motor start switch 34*b*, or the like) are provided in the switch assembly 34R, while the remaining of the plurality of operation members (for example, the mode switch 34*d*) are provided in the switch assembly 34L. Further, in a preferred embodiment of the electric motorcycle 1, the brake lever 32 and a brake device are connected to each other via a hydraulic path (not shown), and a master cylinder 37 in the hydraulic path is fixed to the steering handle 30. The clutch lever 33 and the clutch 13 are connected to each other via a hydraulic path (not shown), and a master cylinder 38 of the hydraulic path is fixed to the steering handle 30.

As shown in FIG. 3, the electric motorcycle 1 includes a vehicle controller 41 and a motor driving unit 42. The vehicle controller 41 and the motor driving unit 42 are electrically connected to each other. For example, the vehicle controller 41 and the motor driving unit 42 (more specifically, a controller 42*b* that defines the motor driving unit 42) provide bidirectional communication according to a network standard such as CAN (Controller Area Network) or the like. The high voltage battery 10 includes a battery cell 10*b* and a controller 10*a*. The controller 10*a* monitors the state (the remaining battery charge or the temperature) of the battery cell 10*b*. The controller 10*a*, the vehicle controller 41, and the motor driving unit 42 are able to communicate with each other. The vehicle controller 41 detects the state of the battery cell 10*b* based on the information from the controller 10*a*.

The vehicle controller 41 is electrically connected to the operation members provided on the steering handle 30 to control the electric motor 6 and various electric components mounted on the vehicle body based on a signal from the operation members or the state of the vehicle (including the state of the battery 10) detected by a sensor or the like. In one example, the vehicle controller 41 is electrically connected to the accelerator grip 31. In detail, the vehicle controller 41 is connected to an accelerator operation sensor 31*a* provided on the accelerator grip 31. The vehicle controller 41 determines the amount of operation (that is, a rotational position) based on a signal from the accelerator operation sensor 31*a* (the amount of operation of the accelerator grip 31 will be hereinafter referred to as an "accelerator operation amount"). Then, the vehicle controller 41 calculates an instruction value based on at least the accelerator operation amount, and then outputs the instruction value to the motor driving unit 42. The motor driving unit 42 receives electric power from the high voltage battery 10, and converts the electric power from the high voltage battery 10 into a driving electric power of the electric motor 6 in accordance with the instruction value (for example, a current), and supplies the driving electric power to the electric motor 6. The motor driving unit 42 includes an inverter 42*a* and the controller 42*b*. For example, the motor driving unit 42 converts a DC from the high voltage battery 10 into an AC in accordance with the instruction value and supplies the AC to the electric motor 6. The electric motor 6 is a three phase AC motor, for example, though the kind thereof is not limited to any specific one.

The vehicle controller 41 preferably uses information obtained from an operation member different from the accelerator grip 31 when calculating the instruction value. That is, the vehicle controller 41 may calculate the instruction value based on the accelerator operation amount and an operation of an operation member by the driver different from the accelerator grip 31. For example, the mode switch 34*d* that switches the control mode of the electric motor 6 may be provided on the accelerator grip 31, and the vehicle controller 41 may calculate the instruction value based on a signal from the mode switch 34d. A switch that switches between a sport mode in which the electric motor 6 outputs a relatively large torque and a beginner mode in which the torque of the electric motor 6 is limited may be used as an example of the mode switch 34d. A switch that switches between a manual mode in which shift positions (the 1st gear, the 2nd gear or the like) are changed in response to a manual operation by a driver and an automatic mode in which the shift positions are automatically changed may be used as another example of the mode switch 34d. The shift positions are achieved using a shifting system provided in a torque transmission path, for example. The shift positions may be spuriously achieved without using a shifting system. That is, information (for example, maps) indicating correlations between accelerator operation amounts and instruction values for the motor 6 may be defined as the plurality of shift positions, respectively, so that the maps are used to change the shift positions.

When calculating the instruction value, the vehicle controller 41 may utilize the state of the vehicle (including the state of the high voltage battery 10) detected by a sensor or the like. That is, the vehicle controller 41 may calculate the instruction value based on the state of the vehicle detected by a sensor in addition to the accelerator operation amount. For example, the vehicle controller 41 may calculate the instruction value based on the state of the high voltage battery 10 based on the information from the controller 10a of the high voltage battery 10 or the controller 42b of the motor driving unit 42. The state of the high voltage battery 10 includes the temperature of the battery cell 10b of the high voltage battery 10, the remaining battery charge, abnormality of the high voltage battery 10, or the like. In the case where the temperature of the battery cell 10b exceeds a threshold or the remaining battery charge is below a threshold, the vehicle controller 41 calculates an instruction value that leads to a decrease in the output of the electric motor 6.

As shown in FIG. 3, the vehicle controller 41 is electrically connected to the brake lever 32. In detail, the vehicle controller 41 is electrically connected to the brake sensor 32a provided on the brake lever 32. The vehicle controller 41 detects the state of operation of the brake lever 32 based on a signal from the brake sensor 32a. Thus, when the brake lever 32 is operated, the vehicle controller 41 causes a brake lamp (not shown) to light. The vehicle controller 41 may execute regenerative control in accordance with the state of operation of the brake lever 32. That is, when the brake lever 32 is operated, the vehicle controller 41 may control a converter or a relay (not shown) such that the high voltage battery 10 is charged using electric power from the electric motor 6.

Further, the vehicle controller 41 may be electrically connected to the clutch lever 33. In detail, the vehicle controller 41 may be electrically connected to a clutch sensor 33a provided on the clutch lever 33. The sensor 33a is a switch, for example, that outputs an on/off signal depending on the state of operation of the clutch lever 33. Alternatively, the sensor 33a may be a position sensor that outputs an electric signal in accordance with the amount of operation (the position of the lever 33) of the clutch lever 33. The vehicle controller 41 detects the state of operation of the clutch lever 33 based on a signal from the clutch sensor 33a. Then, the vehicle controller 41 calculates the instruction value based on the state of operation of the clutch lever 33 in addition to the accelerator operation amount.

Further, the vehicle controller 41 is electrically connected to the motor stop switch 34a and the motor start switch 34b. When a signal is inputted from the motor start switch 34b, the vehicle controller 41 activates the motor driving unit 42, for example, to supply electric power from the motor driving unit 42 to the electric motor 6. When a signal is inputted from the motor stop switch 34a, the vehicle controller 41 stops operation of the motor driving unit 42, for example, to stop supplying electric power from the motor driving unit 42 to the electric motor 6. Further, the vehicle controller 41 is connected to the mode switch 34d and switches the control mode of the electric motor 6 based on a signal from the mode switch 34d.

As shown in FIG. 3, the electric motorcycle 1 includes the low voltage battery 12 that outputs a voltage lower than the voltage outputted by the high voltage battery 10. The output voltage of the low voltage battery 12 is about 12 volts, for example. The vehicle controller 41 and the meter controller 46 to be described below are supplied with electric power from the low voltage battery 12. The low voltage battery 12 is charged by the high voltage battery 10. The electric motorcycle 1 includes a converter 14. Electric power from the high voltage battery 10 is supplied to the low voltage battery 12 after the voltage thereof is lowered by the converter 14.

As shown in FIG. 3, the electric motorcycle 1 includes a main switch 35a. When the main switch 35a is in an on state, the low voltage battery 12 supplies electric power to activate the vehicle controller 41 and the meter controller 46. The main switch 35a is provided on a key cylinder 35 (see FIGS. 4 and 7). The key cylinder 35 is provided under the steering handle 30, for example. In a preferred embodiment of the electric motorcycle 1, the key cylinder 35 is fixed on the foremost portion 51 of the vehicle body frame.

As described above, the operation members 31, 32, 33, 34a, 34b, 34d provided on the steering handle 30 are electrically connected to the vehicle controller 41 (these operation members provided on the steering handle 30 are collectively referred to as an operation member group 30A). That is, the plurality of operation members included in the operation member group 30A are respectively connected to the vehicle controller 41 via a plurality of electric wires. As shown in FIG. 5, the electric motorcycle 1 includes a plurality of harnesses 45A, 45B. Electric wires that connect the plurality of operation members included in the operation member group 30A and the vehicle controller 41 are included in the harnesses 45A, 45B. In the example shown in FIG. 5, an operation member (specifically, the accelerator grip 31, the motor stop switch 34a, the motor start switch 34b, or the like) disposed on the right side of the steering handle 30 is connected to the vehicle controller 41 via the electric wire of the harness 45A, while an operation member disposed on the left side of the steering handle 30 (for example, the clutch lever 33, the mode switch 34d, or the like) is connected to the vehicle controller 41 via the electric wire of the harness 45B. Note that these electric wires may not be necessarily included in the harnesses 45A, 45B. Further, all or some of the plurality of operation members included in the operation member group 30A may be connected to the vehicle controller 41 via an electric wire different from the wires included in the harnesses 45A, 45B.

As shown in FIG. 1, the electric motorcycle 1 includes a harness 43. The motor driving unit 42 and the vehicle controller 41 are connected to each other via the harness 43. The harness 43 includes an electric wire so that, for example, bidirectional communication is possible between the motor driving unit 42 and the vehicle controller 41.

The electric motorcycle 1 includes a case including the motor driving unit 42 disposed therein. As shown in FIG. 1, in a preferred embodiment of the electric motorcycle 1, the motor driving unit 42 is disposed in the drive mechanism case 9 in which the electric motor 6 is disposed. The above arrangement of the motor driving unit 42 shortens the electric wire that connects the motor driving unit 42 and the electric motor 6. Further, the above arrangement needs no dedicated case for the motor driving unit 42 and thus reduces the number of components of the vehicle body.

Preferably, the motor driving unit 42 is partially exposed from the drive mechanism case 9. This effectively cools the motor driving unit 42. In a preferred embodiment of the electric motorcycle 1, the motor driving unit 42 is mounted in the drive mechanism case 9 so that the front surface thereof is exposed from the drive mechanism case 9.

The arrangement of the motor driving unit 42 is not limited to the example shown in FIG. 1. For example, the motor driving unit 42 may be disposed in a case different from the drive mechanism case 9. In this case, the electric motorcycle 1 may include a dedicated case for the motor driving unit 42. Alternatively, the electric motorcycle 1 may include a case where other electric components such as a converter 14 that lowers the voltage of the high voltage battery 10 or the like and the motor driving unit 42 are disposed.

The vehicle controller 41 may be disposed outside the case that includes the motor driving unit 42 disposed therein. In a preferred embodiment of the electric motorcycle 1, the vehicle controller 41 is disposed outside the drive mechanism case 9. As shown in FIG. 1, the distance R1 from the steering handle 30 to the vehicle controller 41 (more specifically, the upper end of the vehicle controller 41) is shorter than the distance R2 from the steering handle 30 to the motor driving unit 42 (more specifically, the upper end of the motor driving unit 42) in a side view of the vehicle body. This arrangement of the vehicle controller 41 shortens the electric wire that connects the operation member group 30A disposed on the steering handle 30 and the vehicle controller 41. That is, the above arrangement of the vehicle controller 41 shortens the electric wires included in the harnesses 45A, 45B. Accordingly, it is possible to simplify the work in laying out the electric wire and to reduce the cost of the electric wire. In a preferred embodiment of the electric motorcycle 1, the number of electric wires that connects the operation member group 30A provided on the steering handle 30 and the vehicle controller 41 is larger than the number of electric wires that connect the motor driving unit 42 and the vehicle controller 41, that is, the number of electric wires included in the harness 43. Accordingly, the above described arrangement of the vehicle controller 41 shortens numerous electric wires.

As described above, the steering handle 30 is turnable rightward and leftward about the steering shaft 5. Preferably, the vehicle controller 41 is mounted on a portion that turns together with the steering handle 30. As shown in FIG. 6, in a preferred embodiment of the electric motorcycle 1, the vehicle controller 41 is supported by the front fork 3. Accordingly, the distance between the operation member group 30A and the vehicle controller 41 remains unchanged when the steering handle 30 turns. This makes it easier to shorten the electric wire connecting these components (in the example of the electric motorcycle 1, the electric wires of the harnesses 45A, 45B).

In a preferred embodiment of the electric motorcycle 1, the vehicle controller 41 is mounted on the upper portion of the front fork 3. Thus, the vehicle controller 41 is positioned above a front fender 17 that covers the front wheel 2. Accordingly, an electric wire that connects the operation member group 30A and the vehicle controller 41 is shorter than the electric wire that connects the vehicle controller 41 and the motor driving unit 42. The vehicle controller 41 is mounted on the front fork 3 via a bracket 53, for example (see FIG. 5).

As shown in FIG. 5, the front fork 3 includes a right suspension 3R and a left suspension 3L. The vehicle controller 41 is positioned between the right suspension 3R and the left suspension 3L in a front view of the vehicle body. This arrangement enables the vehicle controller 41 to be supported by both of the two suspensions 3R, 3L. This makes it possible to improve the stability of supporting the vehicle controller 41. In a preferred embodiment of the electric motorcycle 1, the bracket 53 extends over the two suspensions 3R, 3L. The vehicle controller 41 is fixed to the bracket 53. The front fork 3 includes an upper bracket 3*a* and a lower bracket 3*b* attached to the upper portion thereof to connect the right suspension 3R and the left suspension 3L (see FIG. 4). As shown in FIG. 4, the vehicle controller 41 is positioned between the upper bracket 3*a* and the lower bracket 3*b* in a side view of the vehicle body. Note that the structure that supports the vehicle controller 41 is not limited to the above described example. For example, the vehicle controller 41 may be located on the lateral side of the front fork 3. That is, the vehicle controller 41 may be located on the right side of and fixed to the right suspension 3R. Meanwhile, the vehicle controller 41 may be located on the left side of and fixed to on the left suspension 3L. Further, the vehicle controller 41 may be fixed to either one or both of the upper bracket 3*a* and the lower bracket 3*b*.

As shown in FIG. 4, the vehicle controller 41 may be disposed such that at least a portion thereof overlaps the front fork 3 (more specifically, the suspensions 3R, 3L) in a side view of the vehicle body. This makes it easier to dispose other components at a position forward of the vehicle controller 41. In a preferred embodiment of the electric motorcycle 1, the meter controller 46 is disposed forward of the vehicle controller 41. Alternatively, a headlight may be disposed forward of the vehicle controller 41. In a preferred embodiment of the electric motorcycle 1, in a side view of the vehicle body, the rear portion of the vehicle controller 41 overlaps the suspensions 3R, 3L, and the front portion of the same is positioned more forward than the suspensions 3R, 3L. Alternatively, the vehicle controller 41 may entirely overlap the suspensions 3R, 3L.

The motor driving unit 42 is positioned lower than the steering handle 30. In detail, the motor driving unit 42 is positioned lower than the high voltage battery 10. In other words, the motor driving unit 42 is disposed under the battery case 11. Meanwhile, the vehicle controller 41 is positioned higher than the motor driving unit 42 and farther forward than the battery case 11. Thus, the distance R1 from the steering handle 30 to the vehicle controller 41 is shorter than the distance R2 from the steering handle 30 to the motor driving unit 42.

In a preferred embodiment of the electric motorcycle 1, the vehicle controller 41 is supported by the upper portion of the front fork 3, as described above. The position where the vehicle controller 41 is mounted is not limited to the front fork 3.

As one example, the vehicle controller 41 may be mounted on the vehicle body frame. In a preferred embodiment of the electric motorcycle 1, the vehicle body frame includes a foremost portion 51 including the head pipe 51*a* and positioned forward of the battery case 11. The vehicle controller 41 may be mounted on the foremost portion 51. In this structure as well, the vehicle controller 41 is positioned higher than the motor driving unit 42 and farther forward than the battery case 11. Accordingly, the distance from the steering handle 30 to the vehicle controller 41 is shorter than the distance from the steering handle 30 to the motor driving unit 42.

Alternatively, as another example, the vehicle controller 41 may be mounted on the steering handle 30, for example, as shown in phantom in FIG. 5. In this structure as well, the vehicle controller 41 is positioned higher than the motor driving unit 42 and more forward than the battery case 11. Accordingly, the distance from the steering handle 30 to the vehicle controller 41 is shorter than the distance from the steering handle 30 to the motor driving unit 42.

As shown in FIG. 1, the high voltage battery 10, the motor driving unit 42, and the electric motor 6 are disposed at a middle portion of a vehicle body middle portion. Specifically, the high voltage battery 10, the motor driving unit 42, and the electric motor 6 are disposed below the front portion of the seat 18. In a preferred embodiment of the electric motorcycle 1, the battery case 11 that includes the high voltage battery 10 disposed therein and the drive mechanism case 9, which includes the motor driving unit 42 and the electric motor 6 disposed therein, are located below the front portion of the seat 18. In detail, the rear portion of the battery case 11 and the rear portion of the drive mechanism case 9 are located below the front portion of the seat 18. The above described arrangement shortens the electric wire that carries a large electric current. Specifically, the arrangement shortens the electric wire (not shown) that connects the high voltage battery 10 and the motor driving unit 42 and the electric wire (not shown) that connects the motor driving unit 42 and the electric motor 6. Meanwhile, the vehicle controller 41 is spaced away and forward from the high voltage battery 10, the motor driving unit 42, and the electric motor 6 in a side view of the vehicle body. In other words, the vehicle controller 41 is spaced away and forward from the battery case 11 and the drive mechanism case 9. The arrangement of the vehicle controller 41 shortens the electric wire (in the example of the electric motorcycle 1, the electric wires of the harnesses 45A, 45B) that connects the vehicle controller 41 and the operation member group 30A mounted on the steering handle 30.

In a preferred embodiment of the electric motorcycle 1, the motor driving unit 42 is positioned farther forward than the electric motor 6 and the clutch 13. Thus, compared to a structure in which the motor driving unit 42 is positioned farther rearward than the clutch 13 and the electric motor 6, it is possible to shorten the electric wire (the harness 43) that connects the motor driving unit 42 and the vehicle controller 41.

The drive mechanism case 9 is disposed below and fixed to the battery case 11. As shown in FIG. 1, the harness 43 extends downward from the vehicle controller 41 and then passes through inside the battery case 11 and the drive mechanism case 9 to reach the motor driving unit 42. As shown in FIG. 2, a hole 11e is provided in the battery case 11, and the harness 43 is inserted into the hole 11e. In a preferred embodiment of the electric motorcycle 1, the hole 11e is provided in the front wall portion 11a of the battery case 11. The above described structure reduced a portion of the harness 43 that is exposed outside the vehicle body. Accordingly, it is possible to prevent a driver or an operator from unintentionally touching the harness 43.

The electric motorcycle 1 may include left and right vehicle body covers 21 that cover the side portions of the vehicle body, as shown in FIG. 1. Thus, the vehicle cover 21 may include a portion that extends forward beyond the battery case 11. In this case, as shown in FIG. 2, preferably, the harness 43 is disposed between the left and right vehicle body covers 21. This reduces a portion of the harness 43 that is exposed outside the vehicle body.

As described above, the vehicle controller 41 is connected to the low voltage battery 12, and is supplied with electric power from the low voltage battery 12. As shown in FIG. 1, similar to the vehicle controller 41, the low voltage battery 12 is positioned higher than the motor driving unit 42. This shortens the electric wire that connects the low voltage battery 12 and the vehicle controller 41. In a preferred embodiment of the electric motorcycle 1, the motor driving unit 42 is disposed in the drive mechanism case 9, as described above. Meanwhile, the low voltage battery 12 is disposed outside the drive mechanism case 9.

In a preferred embodiment of the electric motorcycle 1, the low voltage battery 12 is positioned on the lateral side of the high voltage battery 10 (see FIG. 2). In other words, the low voltage battery 12 overlaps the high voltage battery 10 in a side view of the vehicle body. This arrangement shortens the electric wire that connects the low voltage battery 12 and the vehicle controller 41, and also the electric wire that connects the low voltage battery 12 and the high voltage battery 10, compared to a structure in which, for example, the low voltage battery 12 is disposed behind or below the high voltage battery 10.

In a preferred embodiment of the electric motorcycle 1, the low voltage battery 12 is disposed inside the battery case 11. The battery case 11 includes, in the side wall portion 11b thereof, a storage 11d projecting in the lateral direction. The low voltage battery 12 is disposed in the storage 11d.

The arrangement of the low voltage battery 12 is not limited to the example described above. In a preferred embodiment, the low voltage battery 12 may be disposed outside the battery case 11. Further, the low voltage battery 12 may be disposed below the high voltage battery 10 and above the electric motor 6. As still another example, the low voltage battery 12 may be disposed forward of the high voltage battery 10.

As shown in FIG. 1, the low voltage battery 12 and the motor driving unit 42 are both disposed below and farther rearward than the vehicle controller 41. That is, the low voltage battery 12 and the motor driving unit 42 are both positioned in the substantially same direction from the vehicle controller 41. This arrangement enables the harness 43 that connects the motor driving unit 42 and the vehicle controller 41 to include the electric wire that connects the vehicle controller 41 and the low voltage battery 12, that is, an electric wire that supplies electric power from the low voltage battery 12 to the vehicle controller 41.

In a preferred embodiment of the electric motorcycle 1, the low voltage battery 12 is disposed inside the battery case 11. Further, the harness 43 extends through the hole 11e in the battery case 11 toward the inside of the battery case 11. The electric wire that connects the vehicle controller 41 and the low voltage battery 12 is included in the harness 43, and extends to the inside of the battery case 11 through the hole 11e. Thus, the electric wire that connects the vehicle controller 41 and the low voltage battery 12 is separated from the electric wire that connects the vehicle controller 41 and the motor driving unit 42 in the battery case 11.

As described above, the low voltage battery 12 is connected to the high voltage battery 10 via the converter 14. As shown in FIG. 1, the converter 14 is positioned farther rearward than the front end of the high voltage battery 10 and farther forward than the rear end of the same in a side view of the vehicle body. More specifically, the converter 14 is disposed below the high voltage battery 10 and above the electric motor 6. In a preferred embodiment of the electric motorcycle 1, the converter 14 is stored in the drive mechanism case 9. The converter 14 may be disposed on the bottom portion of the battery case 11.

The electric motorcycle 1 includes a meter display 47 (see FIG. 7) and the meter controller 46 (see FIG. 6). The meter display 47 displays the vehicle speed, the remaining battery charge of the high voltage battery 10, or the like. The meter controller 46 controls display of the meter display 47. The meter display 47 is mounted on the steering handle 30. The position where the meter display 47 is mounted and a structure that mounts the meter display 47 are not particularly limited, and the meter display 47 may be mounted on the foremost portion 51 of the vehicle body frame, for example.

The meter controller 46 is supported by the upper portion of the front fork 3, similar to the vehicle controller 41, for example. This layout facilitates electric connection between the meter controller 46, the vehicle controller 41, and the motor driving unit 42. For example, this layout shortens the electric wire (not shown) that connects the meter controller 46 and the vehicle controller 41. Further, this layout enables the harness 43 to include the electric wire that connects the meter controller 46 and the motor driving unit 42. Further, it is possible to shorten an electric wire 48 that connects the meter display 47 and the meter controller 46 (see FIGS. 4 and 6). The position on the meter display 47 to which the electric wire 48 is connected and the position on the meter controller 46 to which the electric wire 48 is connected are not limited to the examples shown in FIGS. 4 and 6, and may be desirably changed.

In a preferred embodiment of the electric motorcycle 1, the meter controller 46 and the vehicle controller 41 are aligned in the front-back direction. As shown in FIG. 4, the meter controller 46 is disposed forward of the vehicle controller 41, for example. The arrangement of the meter controller 46 and the vehicle controller 41 is not limited to the above described arrangement. For example, the meter controller 46 and the vehicle controller 41 may be aligned in the left-right direction. As another example, the meter controller 46 and the vehicle controller 41 may be aligned in the up-down direction. As shown in FIG. 4 or the like, a structure in which the meter controller 46 and the vehicle controller 41 are separately provided enables vehicles of two different types to use different settings for the vehicle controller 41 while commonly using the meter controller 46.

Alternatively, the meter controller 46 and the vehicle controller 41 may be integral. For example, the vehicle controller 41 may be mounted on a circuit board of the meter controller 46. That is, electronic components that define and function as the vehicle controller 41, such as a microprocessor, a memory, or the like may be mounted on the circuit board of the meter controller 46. With the above configuration, it is possible to reduce the number of components.

As shown in FIG. 4, the front panel 22 may be disposed forward of the meter controller 46 and the vehicle controller 41 to cover the meter controller 46 and the vehicle controller 41. Instead of the example shown in FIG. 4, a headlight may be disposed forward of the meter controller 46 and the vehicle controller 41.

As shown in FIG. 3, the electric motorcycle 1 includes a vehicle speed sensor 36. In a preferred embodiment of the electric motorcycle 1, the vehicle speed sensor 36 is mounted on the axle of the front wheel 2. The vehicle controller 41 and the vehicle speed sensor 36 are connected to each other via an electric wire 44. The meter controller 46 receives the vehicle speed from the vehicle controller 41. The electric wire 44 is supported by the front fork 3. Alternatively, the vehicle speed sensor 36 may be connected to the meter controller 46 via the electric wire 44. Further, the vehicle speed sensor 36 may be connected to both of the meter controller 46 and the vehicle controller 41 via the electric wire 44. The vehicle controller 41 is able to execute traction control, for example, utilizing the motor rotation speed and a signal from the vehicle speed sensor 36. That is, the vehicle controller 41 compares the rotation speed of the rear wheel 7 calculated based on the motor rotation speed and the rotation speed of the front wheel 2 calculated based on a signal from the vehicle speed sensor 36, to control the torque of the electric motor 6 based on a result of the comparison. The motor rotation speed is calculated by the motor driving unit 42 based on a signal from a magnetic position sensor mounted on the electric motor 6. In this case, the vehicle controller 41 receives the motor rotation speed from the motor driving unit 42.

As described above, the vehicle controller 41 is disposed outside the case in which the motor driving unit 42 is disposed. Thus, the distance R1 from the steering handle 30 to the vehicle controller 41 is shorter than the distance R2 from the steering handle 30 to the motor driving unit 42 in a side view of the vehicle body. This shortens the electric wires that connect the operation member group 30A provided on the steering handle 30 and the vehicle controller 41, that is, the electric wires included in the harness 45A, 45B in a preferred embodiment of the electric motorcycle 1. Accordingly, it is possible to simplify the work in laying out the electric wires and also to reduce the cost of the electric wires.

The vehicle controller 41 is supported by the front fork 3. This enables the distance between the operation member group 30A mounted on the steering handle 30 and the vehicle controller 41 to remain unchanged when the steering handle 30 is rotated. Accordingly, this makes it easier to shorten the electric wire that connects the operation member group 30A and the vehicle controller 41 (in a preferred embodiment of the electric motorcycle 1, the electric wire of the harness 45A, 45B).

Note that preferred embodiments of the present invention are not limited to the above described electric motorcycle 1, and can be modified in various manners.

For example, the present invention may be applied to an electric motorcycle of a scooter type. In this case, the high voltage battery 10 is disposed on a footboard on which a driver places his/her foot, and the electric motor 6 and the motor driving unit 42 may be located behind the high voltage battery 10. In a vehicle of this type, the distance R1 from the steering handle 30 to the vehicle controller 41 is shorter than the distance R2 from the steering handle 30 to the motor driving unit 42 in a side view of the vehicle body.

The vehicle controller 41 may be supported by the vehicle body frame, rather than by the front fork 3. In this case, the vehicle controller 41 may be mounted on the foremost portion 51 of the vehicle body frame, for example.

Figure 8:
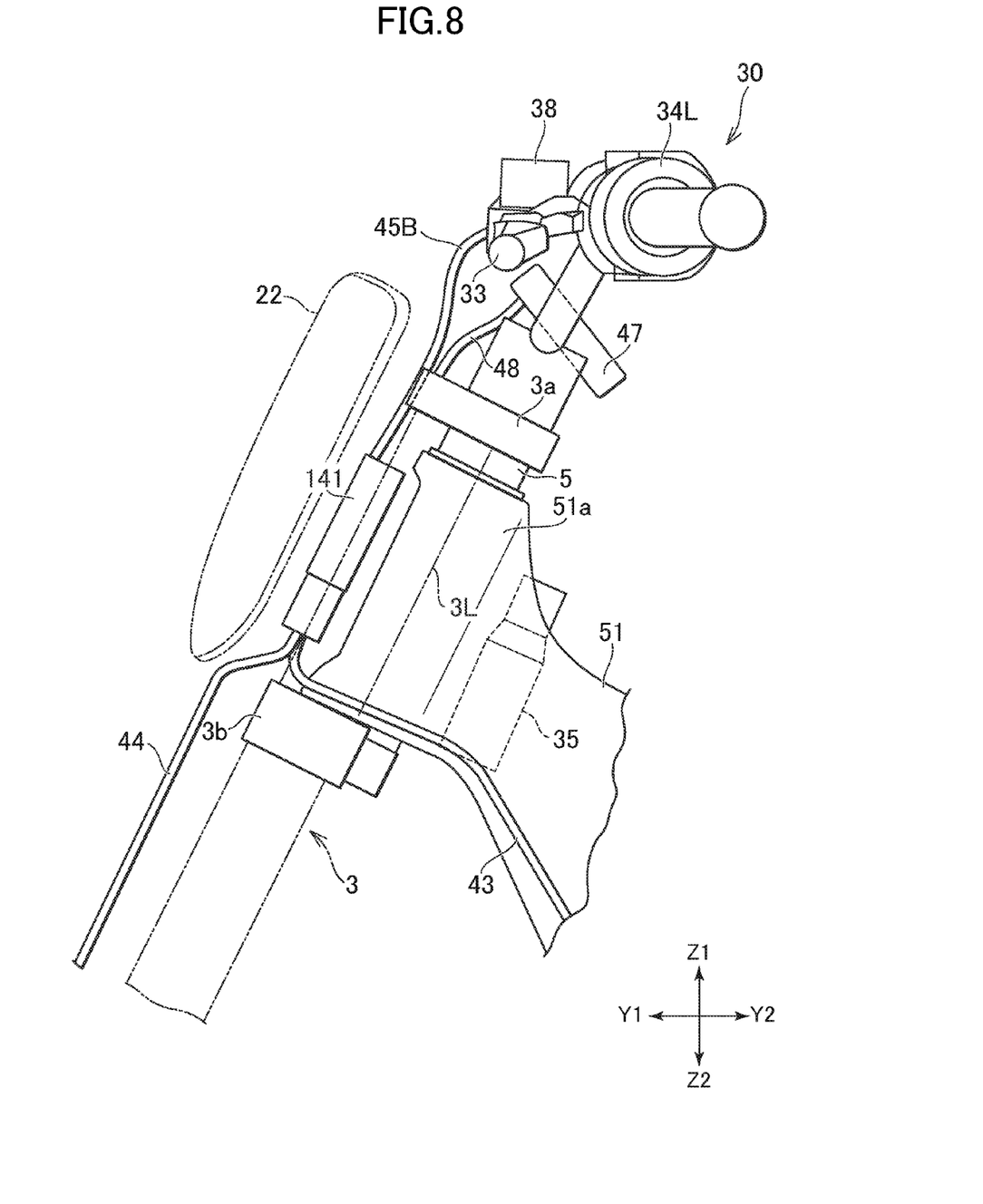
FIG. 8 shows a modified example of an electric motorcycle, showing a front portion of a vehicle body, similar to that shown in FIG. 4.

As described above, the meter controller 46 and the vehicle controller 41 may be integral. FIG. 8 shows an example of this structure. The electric motorcycle in FIG. 8 includes a vehicle controller 141. The vehicle controller 141 includes a circuit board that defines and functions as the above described meter controller 46 and electronic components that define and function as the above described vehicle controller 41, such as a microprocessor and a memory that are mounted on the circuit board. In the example shown, the vehicle controller 141 is supported by the front fork 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type electric vehicle comprising:
a rear wheel;
a front wheel;
an electric motor that drives the rear wheel;
a steering handle that turns with the front wheel;
a plurality of operation members that are operated by a driver, the plurality of operation members being mounted on the steering handle and including an accelerator operation member;
a vehicle controller electrically connected to the plurality of operation members and configured or programmed to output an instruction value based on at least an amount of operation of the accelerator operation member;
a motor driving unit electrically connected to the vehicle controller and that supplies a driving electric power to the electric motor in accordance with the instruction value; and
a case including the motor driving unit disposed therein; wherein
the vehicle controller is disposed outside the case;
a distance from the steering handle to the vehicle controller is shorter than a distance from the steering handle to the motor driving unit in a side view of the vehicle;
the steering handle is supported so as to be operated by the driver to turn rightward and leftward; and
the vehicle controller is mounted to turn together with the steering handle.

2. The straddle-type electric vehicle according to claim 1, further comprising a front fork on which the steering handle is mounted, wherein the vehicle controller is supported by the front fork.

3. The straddle-type electric vehicle according to claim 2, wherein the front fork includes a right suspension and a left suspension, and the vehicle controller is positioned between the right suspension and the left suspension in a front view of the vehicle.

4. The straddle-type electric vehicle according to claim 1, wherein the vehicle controller is supported by the steering handle.

5. The straddle-type electric vehicle according to claim 2, further comprising a meter controller configured or programmed to control a meter indicating a state of running of the vehicle, wherein the meter controller and the vehicle controller are both supported by the front fork.

6. The straddle-type electric vehicle according to claim 5, wherein the vehicle controller is mounted on a substrate of the meter controller.

7. The straddle-type electric vehicle according to claim 1, wherein the plurality of operation members include at least one of a main switch that activates the vehicle controller, a motor start switch, and a motor stop switch.

8. The straddle-type electric vehicle according to claim 1, wherein the steering handle and the vehicle controller are both located higher than the motor driving unit.

9. The straddle-type electric vehicle according to claim 1, further comprising:

a first battery that stores electric power to be supplied to the electric motor; and
a second battery that outputs a voltage lower than a voltage which is outputted by the first battery; wherein
the vehicle controller is connected to the second battery.

10. The straddle-type electric vehicle according to claim 9, wherein the second battery and the vehicle controller are positioned higher than the motor driving unit and are electrically connected to each other.

11. The straddle-type electric vehicle according to claim 10, wherein the second battery is disposed outside the case and the motor driving unit is disposed inside the case.

12. The straddle-type electric vehicle according to claim 1, further comprising a first battery that stores electric power to be supplied to the electric motor; wherein
the first battery, the electric motor, and the motor driving unit are disposed in a middle portion of the vehicle; and
the vehicle controller is spaced away and forward from the first battery, the electric motor, and the motor driving unit.

13. The straddle-type electric vehicle according to claim 12, further comprising:
a battery case that stores the first battery; and
an electric wire electrically connecting the vehicle controller and the motor driving unit to each other, wherein
the case including the motor driving unit disposed therein is fixed to the battery case; and
the electric wire extends through an inside of the battery case and to the motor driving unit.

14. The straddle-type electric vehicle according to claim 1, wherein the vehicle controller is configured or programmed to calculate the instruction value based on at least one of an operation of an operation member that is different from the accelerator operation member and a state of the vehicle detected by a sensor, in addition to the amount of operation of the accelerator operation member.

15. A straddle-type electric vehicle comprising:
a driving wheel;
an electric motor that drives the driving wheel;
a plurality of operation members that are operated by a driver, the plurality of operation members being mounted on a steering handle and including an accelerator operation member;
a vehicle controller electrically connected to the plurality of operation members and configured or programmed to output an instruction value based on at least an amount of operation of the accelerator operation member;
a motor driving unit electrically connected to the vehicle controller and that supplies a driving electric power to the electric motor in accordance with the instruction value;
a case including the motor driving unit disposed therein; and
a first battery that stores electric power to be supplied to the electric motor; wherein
the vehicle controller is disposed outside the case;
the steering handle and the vehicle controller are both located higher than the motor driving unit;
the motor driving unit and the electric motor are disposed below the first battery;
the vehicle controller is disposed forward of the first battery;
in a side view of the vehicle when the steering handle is in a forward facing position, the steering handle is located at least partially between the vehicle controller and at least one of the motor driving unit, the electric motor, and the first battery in a forward-rearward direction of the vehicle; and a distance from the steering handle to the vehicle controller is shorter than a distance from the steering handle to the motor driving unit in the side view of the vehicle.

16. The straddle-type electric vehicle according to claim 15, further comprising a second battery that outputs a voltage lower than a voltage which is outputted by the first battery; wherein the second battery is located in a lateral direction of the first battery; and the vehicle controller is located higher than the second battery.

17. A straddle-type electric vehicle comprising:

a driving wheel;

an electric motor that drives the driving wheel;

a plurality of operation members that are operated by a driver, the plurality of operation members being mounted on a steering handle and including an accelerator operation member;

a vehicle controller electrically connected to the plurality of operation members and configured or programmed to output an instruction value based on at least an amount of operation of the accelerator operation member;

a motor driving unit electrically connected to the vehicle controller and that supplies a driving electric power to the electric motor in accordance with the instruction value;

a drive mechanism case including the motor driving unit and the electric motor disposed therein;

a first battery that stores electric power to be supplied to the electric motor; and a battery case including the first battery disposed therein; wherein the vehicle controller is disposed outside the drive mechanism case;

the drive mechanism case and the battery case are fixed to each other;

the vehicle controller is located in front of the drive mechanism case and the battery case; and a distance from the steering handle to the vehicle controller is shorter than a distance from the steering handle to the motor driving unit in a side view of the vehicle.

18. A straddle-type electric vehicle comprising:

a driving wheel;

an electric motor that drives the driving wheel;

a plurality of operation members that are operated by a driver, the plurality of operation members being mounted on a steering handle and including an accelerator operation member;

a vehicle controller electrically connected to the plurality of operation members and configured or programmed to output an instruction value based on at least an amount of operation of the accelerator operation member;

a motor driving unit electrically connected to the vehicle controller and that supplies a driving electric power to the electric motor in accordance with the instruction value; and a case including the motor driving unit disposed therein; wherein the vehicle controller is disposed outside the case;

the vehicle controller is mounted on the steering handle; and a distance from the steering handle to the vehicle controller is shorter than a distance from the steering handle to the motor driving unit in a side view of the vehicle.

* * * * *